(12) United States Patent
Kojima

(10) Patent No.: US 12,486,882 B2
(45) Date of Patent: Dec. 2, 2025

(54) ANTI-VIBRATION DEVICE

(71) Applicant: Prospira Corporation, Kawasaki (JP)

(72) Inventor: Hiroshi Kojima, Kawasaki (JP)

(73) Assignee: Prospira Corporation, Kawasaki (JP)

( * ) Notice: Subject to any disclaimer, the term of this patent is extended or adjusted under 35 U.S.C. 154(b) by 346 days.

(21) Appl. No.: 18/247,745

(22) PCT Filed: Sep. 22, 2021

(86) PCT No.: PCT/JP2021/034843
§ 371 (c)(1),
(2) Date: Apr. 4, 2023

(87) PCT Pub. No.: WO2022/075067
PCT Pub. Date: Apr. 14, 2022

(65) Prior Publication Data
US 2023/0358293 A1    Nov. 9, 2023

(30) Foreign Application Priority Data

Oct. 8, 2020  (JP) .................................. 2020-170269

(51) Int. Cl.
*F16F 13/10* (2006.01)
*B60K 5/12* (2006.01)

(52) U.S. Cl.
CPC .......... *F16F 13/107* (2013.01); *B60K 5/1208* (2013.01)

(58) Field of Classification Search
CPC ............................. F16F 13/107; B60K 5/1208
See application file for complete search history.

(56) References Cited

U.S. PATENT DOCUMENTS

| 5,443,574 A | 8/1995 | Ohtake et al. |
| 2009/0038896 A1 | 2/2009 | Nishi et al. |
| 2016/0160956 A1 | 6/2016 | Ueki |
| 2019/0226549 A1 | 7/2019 | Kojima |

(Continued)

FOREIGN PATENT DOCUMENTS

| CN | 111201388 A | 5/2020 |
| DE | 102016206948 A1 | 10/2017 |

(Continued)

OTHER PUBLICATIONS

WO document No. WO 2018051627 to Kojima published on Mar. 22, 2018.*

(Continued)

*Primary Examiner* — Pamela Rodriguez
(74) *Attorney, Agent, or Firm* — KENJA IP LAW PC

(57) ABSTRACT

A partition member includes a first orifice passage extending from a main liquid chamber to the side of a sub-liquid chamber, and a second orifice passage extending from the sub-liquid chamber to the side of the main liquid chamber and connected to the first orifice passage. The first orifice passage extends from the main liquid chamber to one side in a circumferential direction. The second orifice passage extends from a connection portion with the first orifice passage to the other side in the circumferential direction. In the partition member, a short passage directly connecting the connection portion between the first orifice passage and the second orifice passage and the sub-liquid chamber is formed.

1 Claim, 2 Drawing Sheets

(56) References Cited

U.S. PATENT DOCUMENTS

2020/0217392 A1* 7/2020 Kojima ................ F16F 13/105
2020/0232534 A1 7/2020 Kojima

FOREIGN PATENT DOCUMENTS

| EP | 4033118 A1 | 7/2022 |
| JP | H06105095 B2 | 12/1994 |
| JP | 2006029591 A | 2/2006 |
| JP | 2006097823 A | 4/2006 |
| JP | 2009041740 A | 2/2009 |
| JP | 2010286027 A | 12/2010 |
| JP | 2014098445 A | 5/2014 |
| JP | 2018017304 A | 2/2018 |
| JP | 2019215052 A | 12/2019 |
| KR | 101565052 B1 | 11/2015 |
| WO | 2005106283 A1 | 11/2005 |
| WO | 2018051627 A1 | 3/2018 |
| WO | 2019074049 A1 | 4/2019 |
| WO | 2019074069 A1 | 4/2019 |

OTHER PUBLICATIONS

Japanese Patent No. JP 2018204675 to Matsumoto published on Dec. 27, 2018.*
WO document No. WO 2020/213225 to Kojima published on Oct. 22, 2020.*
Translation of Japanese Patent No. JP 2018017304 obtained from website: https://worldwide.espacenet.com on Jun. 30, 2025.*
Mar. 28, 2023, International Preliminary Report on Patentability issued in the International Patent Application No. PCT/JP2021/034843.
Sep. 23, 2024, search result of the Extended European Search Report issued by the European Patent Office in the corresponding European Patent Application No. 21877368.7.
Nov. 9, 2021, International Search Report issued in the International Patent Application No. PCT/JP2021/034843.
Jul. 22, 2025, search result of Office Action issued by the China National Intellectual Property Administration in the corresponding Chinese Patent Application No. 202180068701.7.

* cited by examiner

ANTI-VIBRATION DEVICE

TECHNICAL FIELD

The present disclosure relates to an anti-vibration device.

This application claims priority based on Japanese Patent Application No. 2020-170269 filed on Oct. 8, 2020, the entire contents of which are incorporated herein by reference.

BACKGROUND

Conventionally, as disclosed in Patent Literature (PTL) 1 below, there is known an anti-vibration device that includes a cylindrical first attachment member connected to one of a vibration generator and a vibration receiver and a second attachment member connected to the other, an elastic body connecting the first attachment member and the second attachment member, and a partition member partitioning a liquid chamber in the first attachment member into a main liquid chamber having the elastic body as a part of a partition wall and a sub-liquid chamber, and an orifice passage connecting the main liquid chamber and the sub-liquid chamber is formed in the partition member.

When vibration is input to the anti-vibration device, the first attachment member and the second attachment member are relatively displaced while elastically deforming the elastic body. As the internal pressure of the main liquid chamber fluctuates, this vibration is damped and absorbed by a liquid circulating in the orifice passage.

CITATION LIST

Patent Literature

PTL 1: WO 2018/051627 A1

SUMMARY

Technical Problem

By the way, the anti-vibration device with the above configuration has a problem that it is difficult to damp and/or absorb input vibration when the amplitude fluctuates even if the frequency is the same.

It would be helpful to provide an anti-vibration device capable of damping and absorbing input vibration even if the amplitude increases or decreases, as long as the frequency is the same.

Solution to Problem

To resolve the above issue, an anti-vibration device includes a cylindrical first attachment member connected to one of a vibration generator and a vibration receiver and a second attachment member connected to the other, an elastic body connecting the first attachment member and the second attachment member, and a partition member partitioning a liquid chamber in the first attachment member into a main liquid chamber and a sub-liquid chamber, the main liquid chamber having the elastic body as a part of a partition wall. The partition member includes a first orifice passage extending from the main liquid chamber to the side of the sub-liquid chamber, and a second orifice passage extending from the sub-liquid chamber to the side of the main liquid chamber and connected to the first orifice passage. The first orifice passage extends from the main liquid chamber to one side in a circumferential direction along a central axis of the first attachment member. The second orifice passage extends from a connection portion with the first orifice passage to the other side in the circumferential direction. In the partition member, a short passage directly connecting the connection portion between the first orifice passage and the second orifice passage and the sub-liquid chamber is formed.

Advantageous Effect

According to the present disclosure, input vibration can be damped and absorbed even if the amplitude is increased or decreased, as long as the frequency is the same.

DETAILED DESCRIPTION

Figure 1:
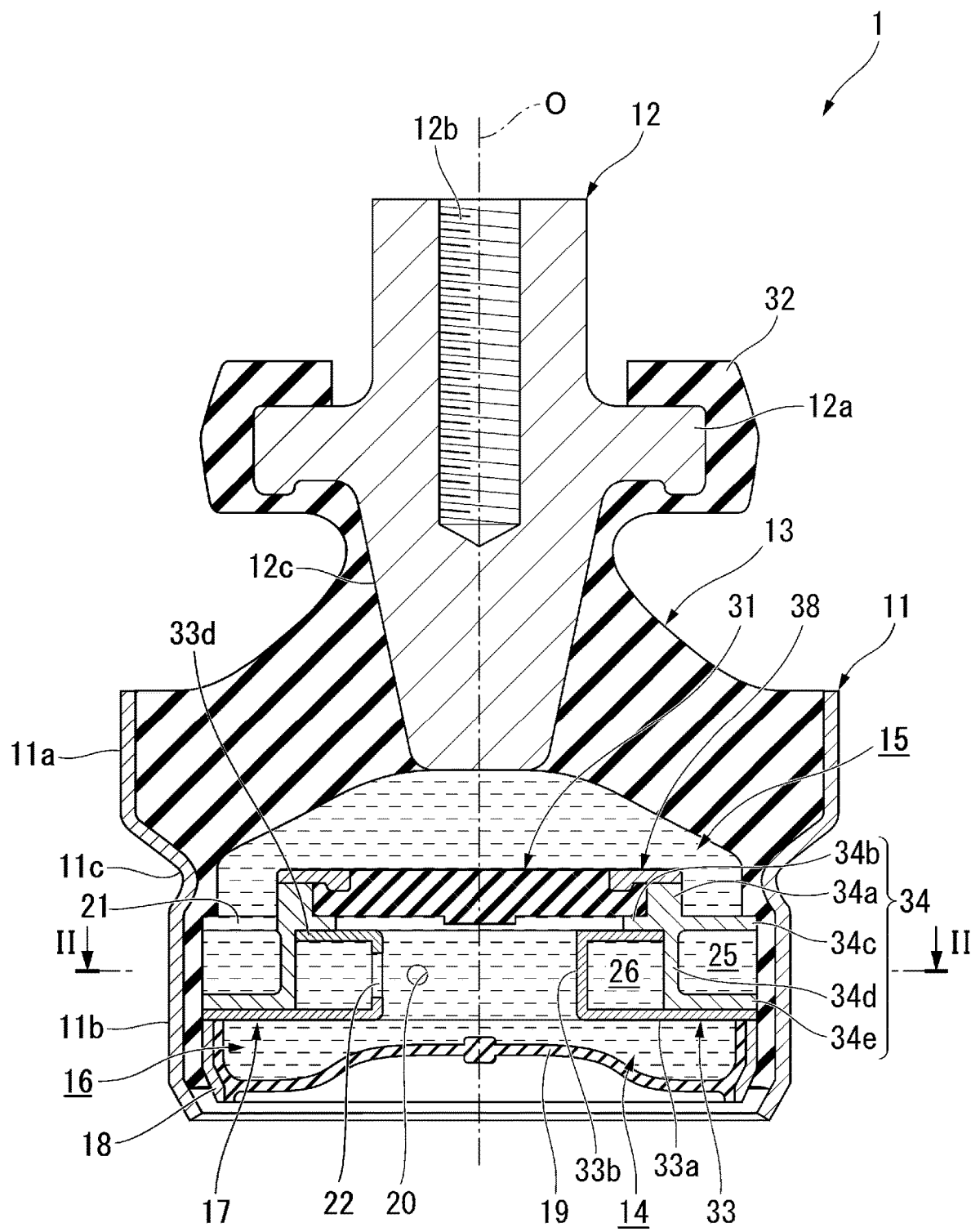
FIG. 1 is a longitudinal sectional view of an anti-vibration device according to an embodiment of the present disclosure.

An anti-vibration device according to an embodiment will be described below with reference to FIGS. 1 and 2.

An anti-vibration device 1 includes a cylindrical first attachment member 11 connected to one of a vibration generator and a vibration receiver and a second attachment member 12 connected to the other, an elastic body 13 connecting the first attachment member 11 and the second attachment member 12, and a partition member 17 partitioning a liquid chamber 14 in the first attachment member 11 into a main liquid chamber 15 having the elastic body 13 as a part of a partition wall and a sub-liquid chamber 16.

When this anti-vibration device 1 is used, for example, as an engine mount for an automobile, the first attachment member 11 is connected to a vehicle body as the vibration receiver and the second attachment member 12 is connected to an engine as the vibration generator. This suppresses the transmission of engine vibration to the vehicle body.

In the illustrated example, the partition member 17 divides the liquid chamber 14 into the main liquid chamber 15 and the sub-liquid chamber 16 along an axial direction along the central axis O of the first attachment member 11. In other words, the partition member 17 divides the liquid chamber 14 into the main liquid chamber 15 on one side along the axial direction and the sub-liquid chamber 16 on the other side along the axial direction.

Hereafter, the side in which the main liquid chamber 15 is located along the axial direction with respect to the partition member 17 is referred to as an upper side, and the side of the sub-liquid chamber 16 as a lower side. Viewing the anti-vibration device 1 from the axial direction, a direction intersecting the central axis O is referred to as a radial direction, and a direction circumferential around the central axis O is referred to as a circumferential direction.

The first attachment member 11 has an upper cylindrical portion 11a located on the upper side, a lower cylindrical portion 11b having smaller inner and outer diameters than the upper cylindrical portion 11a and located on the lower side, and an aperture portion 11c connecting the upper cylindrical portion 11a and the lower cylindrical portion 11b and extending continuously around the entire circumference. An inner peripheral surface of the lower cylindrical portion 11b is covered with coating rubber. The coating rubber is integrally formed with the elastic body 13.

The second attachment member 12 is formed in the shape of a rod and is disposed coaxially with the central axis O. The second attachment member 12 is disposed inside the first attachment member 11 in the radial direction. A flange portion 12a protruding outward in the radial direction is formed in a middle portion of the second attachment member 12 in the axial direction. A female thread portion 12b is formed on an upper end surface of the second attachment member 12. A tapered portion 12c having a reduced diameter toward the lower side is formed in a portion of the second attachment member 12 located on the lower side with respect to the flange portion 12a. The flange portion 12a is located on the upper side with respect to the first attachment member 11. A lower end of the second attachment member 12 is located on the lower side with respect to an upper end opening edge of the first attachment member 11.

The elastic body 13 is formed in an annular shape and is disposed coaxially with the central axis O. The elastic body 13 connects the upper cylinder portion 11a of the first attachment member 11 and the tapered portion 12c of the second attachment member 12. An outer peripheral side of the elastic body 13 is integrally vulcanization bonded to each inner peripheral surface of the upper cylindrical portion 11a and aperture portion 11c in the first attachment member 11. An inner peripheral side of the elastic body 13 is vulcanization bonded to the tapered portion 12c of the second attachment member 12. The elastic body 13 extends to the upper side from outward to inward in the radial direction. The elastic body 13 seals an upper end opening of the first attachment member 11.

The elastic body 13 is integrally formed with a stopper rubber 32 that integrally covers an upper surface, lower surface, and outer peripheral surface of the flange portion 12a of the second attachment member 12.

A cylindrical diaphragm ring 18 is liquid-tightly fitted into a lower end portion of the first attachment member 11 via the coating rubber. To an inner peripheral surface of the diaphragm ring 18, an outer periphery of a diaphragm 19, which is formed of a rubber material or the like to be elastically deformable, is vulcanization bonded. The diaphragm ring 18 is secured to the first attachment member 11 by the lower end portion of the first attachment member 11 being swaged inwardly in the radial direction. The diaphragm 19 seals a lower end opening of the first attachment member 11.

The diaphragm 19 and elastic body 13 define, in the first attachment member 11, the liquid chamber 14 in which a liquid is sealed. The liquid to be sealed in the liquid chamber 14 includes, for example, ethylene glycol, water, silicone oil, or the like.

The partition member 17 is formed in the shape of a flat disk. The partition member 17 is disposed coaxially with the central axis O. The partition member 17 is fitted into the first attachment member 11. The partition member 17 is sandwiched in the axial direction between the aperture portion 11c of the first attachment member 11 and the diaphragm ring 18. The partition member 17 divides the liquid chamber 14 in the first attachment member 11 into the main liquid chamber 15 defined by the elastic body 13 and partition member 17 and the sub-liquid chamber 16 defined by the diaphragm 19 and partition member 17. The diaphragm 19 expands and contracts as the liquid flows into and out of the sub-liquid chamber 16.

The partition member 17 includes a membrane 31 that forms a part of a partition wall of each of the main liquid chamber 15 and sub-liquid chamber 16 and that is provided to be elastically deformable, a first orifice passage 25 extending from the main liquid chamber 15 to the side in which the sub-liquid chamber 16 is located, a second orifice passage 26 extending from the sub-liquid chamber 16 to the side in which the main liquid chamber 15 is located and connected to the first orifice passage 25, an upper member 34 enclosing the membrane 31 from the outside in the radial direction, a lower member 33 fitted into the upper member 34, and an annular fixed member 38 securing the membrane 31 to the upper member 34.

The partition member 17 does not have to have at least one of the upper member 34, lower member 33, or fixed member 38, and the upper member 34, lower member 33, and fixed member 38 may be formed integrally.

The membrane 31 is formed of a rubber material or the like to be elastically deformable. The membrane 31 is formed in the shape of a plate. The membrane 31 has a circular shape, for example, when viewed from the axial direction.

The membrane 31 may have a rectangular shape, for example, when viewed from the axial direction. The membrane 31 is disposed coaxially with the central axis O. The membrane 31 does not have a through hole passing through in the axial direction. The membrane 31 is provided so as not to collide with other members provided in the liquid chamber 14 during elastic deformation caused by input of vibration.

The upper member 34 has a fixed cylinder 34a surrounding the membrane 31 from the outside in the radial direction, an annular fixed flange 34b protruding inward in the radial direction from a lower end opening edge of the fixed cylinder 34a, an annular upper flange 34c protruding outward in the radial direction from the lower end opening edge of the fixed cylinder 34a, an outer cylinder 34d protruding to the lower side from the fixed cylinder 34a, and a lower flange 34e protruding outward in the radial direction from a lower end opening edge of the outer cylinder 34d.

The fixed cylinder portion 34a, fixed flange 34b, upper flange 34c, outer cylinder 34d, and lower flange 34e are arranged coaxially with the central axis O.

An outer peripheral edge of each of the upper flange 34c and lower flange 34e is fitted into the lower cylindrical portion 11b via the coating rubber.

The fixed member 38 is placed on an upper end opening edge of the fixed cylinder 34a, and the fixed member 38 is secured to the upper member 34 with not-illustrated bolts or the like. By the fixed member 38 and fixed flange 34b, an outer peripheral edge of the membrane 31 is pinched and fixed in the axial direction. Thereby, the membrane 31 is elastically deformed in the axial direction with the outer peripheral edge as a fixed end with fluctuations in the internal pressure of the main liquid chamber 15.

The lower member 33 is fitted into the outer cylinder 34d of the upper member 34. The lower member 33 includes an annular bottom plate 33a, an inner cylinder 33b protruding upward from an inner peripheral edge of the bottom plate 33a, and an annular top plate 33d protruding outward in the radial direction from an upper end opening edge of the inner cylinder 33b.

The bottom plate 33a, inner cylinder 33b, and top plate 33d are arranged coaxially with the central axis O.

An outer peripheral edge of the bottom plate 33a is fitted into the lower cylindrical portion 11b via the coating rubber. In an upper surface of the bottom plate 33a, an outer circumferential portion is in contact with a lower surface of the lower flange 34e of the upper member 34, and an inner circumferential portion is located inward from the lower flange 34e and outer cylinder 34d in the radial direction. The inner cylinder 33b is located inward from the outer cylinder 34d in the radial direction. An outer peripheral edge of the top plate 33d is fitted into the outer cylinder 34d. An upper surface of the top plate 33d is in contact with a lower surface of the fixed flange 34b.

An opening 21 (hereinafter referred to as first connecting hole) provided on the main liquid chamber 15 in the first orifice passage 25 is formed in the upper flange 34c of the upper member 34. The first connecting hole 21 is open in the axial direction to the main liquid chamber 15. The first connecting hole 21 may be open in the radial direction to the main liquid chamber 15.

An opening 22 (hereinafter referred to as second connecting hole) provided on the sub-liquid chamber 16 in the second orifice passage 26 is formed in the inner cylinder 33b of the lower member 33. The second connecting hole 22 is located inward from the first connecting hole 21 in the radial direction. The positions of the second connecting hole 22 and first connecting hole 21 in the circumferential direction are equivalent to each other. As illustrated in FIG. 2, the first connecting hole 21 and second connecting hole 22 are adjacent to each other in the radial direction through the outer cylinder 34d of the upper member 34 and the second orifice passage 26, when viewed from the axial direction. The second connecting hole 22 is open in the radial direction to the sub-liquid chamber 16. Note that, the second connecting hole 22 may be open in the axial direction to the sub-liquid chamber 16. The second connecting hole 22 is open to a portion of the sub-liquid chamber 16 that is surrounded from the outside in the radial direction by the first orifice passage 25 and second orifice passage 26 and that is opposite a lower surface of the membrane 31 in the axial direction.

The first orifice passage 25 extends from the main liquid chamber 15 to one side in the circumferential direction. The first orifice passage 25 is defined by the upper flange 34c, outer cylinder 34d, and lower flange 34e in the upper member 34 and the coating rubber on the inner peripheral surface of the lower cylindrical portion 11b.

The first orifice passage 25 is provided over an angular range of greater than 180° and less than 360° around the central axis O. Note that, this angular range may be 180° or less, 360° or less, or greater than 360°.

The first orifice passage 25 is located below the membrane 31. The first orifice passage 25 is located outside the membrane 31 in the radial direction.

Here, the upper member 34 includes an outer partition wall 34f that protrudes outward from the outer cylinder 34d in the radial direction and that has its outer peripheral edge fitted into the coating rubber on the inner peripheral surface of the lower cylindrical portion 11b. The outer partition wall 34f defines both end portions of the first orifice passage 25 in the circumferential direction.

In the outer cylinder 34d, a connection hole (connection portion) 27 penetrating in the radial direction is formed in a portion located on the opposite side of the first connecting hole 21, with the outer partition wall 34f sandwiched therebetween in the circumferential direction, when viewed from the axial direction. The connection hole 27 and first connecting hole 21 are adjacent to the outer partition wall 34f in the circumferential direction, when viewed from the axial direction.

The connection hole 27 is open to, in an inner surface defining one of the end portions (connection portions) of the first orifice passage 25 in the circumferential direction, an inner peripheral surface that is located inward in the radial direction and that faces outward in the radial direction. The connection hole 27 connects, in the radial direction, the one of the end portions of the first orifice passage 25 in the circumferential direction and the second orifice passage 26.

The second orifice passage 26 extends from the connection portion with the first orifice passage 25 to the other side in the circumferential direction. The second orifice passage 26 is located inward from the first orifice passage 25 in the radial direction. Outer peripheral edges of the second orifice passage 26 and membrane 31 are equivalent in position to each other in the radial direction. The second orifice passage 26 is defined by the inner circumferential portion of the bottom plate 33a, inner cylinder 33b, and top plate 33d in the lower member 33, and the outer cylinder 34d of the upper member 34. The second orifice passage 26 is located below the membrane 31.

The second orifice passage 26 is provided over an angular range of greater than 180° and less than 360° around the central axis O. This angular range may be 180° or less, 360° or less, or greater than 360°. The angular ranges of the second orifice passage 26 and first orifice passage 25 are equivalent to each other. The angular ranges of the second orifice passage 26 and first orifice passage 25 may be different from each other.

Figure 2:
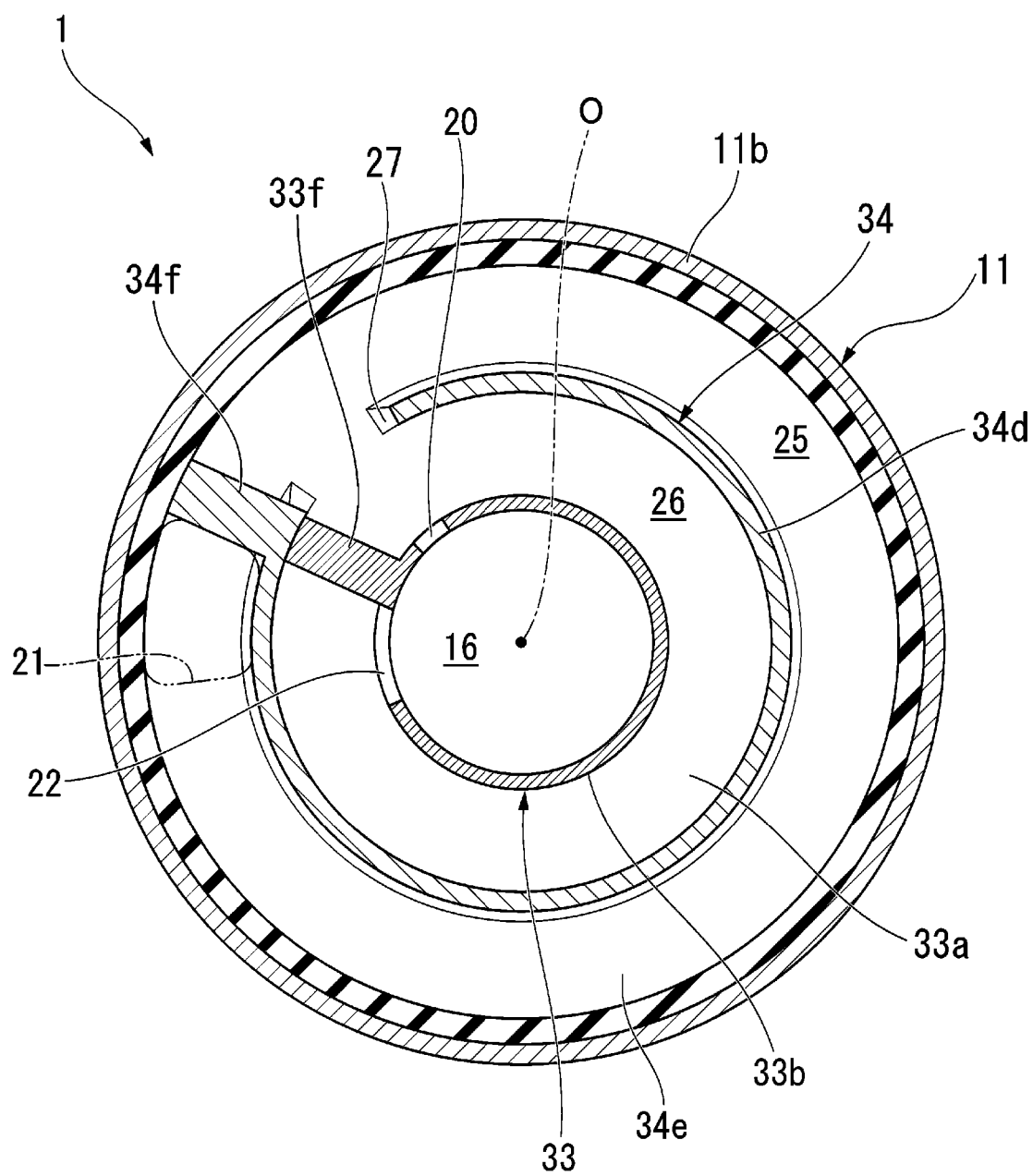
FIG. 2 is a II-II arrow cross-sectional view of the anti-vibration device in FIG. 1.

Here, as illustrated in FIG. 2, the lower member 33 has an inner partition wall 33f that protrudes outward from the inner cylinder 33b in the radial direction and that has its outer peripheral edge fitted into the outer cylinder 34d on the upper member 34. The inner partition wall 33f defines both end portions of the second orifice passage 26 in the circumferential direction. The positions of the inner partition wall 33f and outer partition wall 34f are equivalent to each other in the circumferential direction. The inner partition wall 33f and outer partition wall 34f are provided in a row in the radial direction. The positions of the second orifice passage 26 and first orifice passage 25 in the circumferential direction are equivalent to each other over the entire length in the circumferential direction. The positions of the second orifice passage 26 and first orifice passage 25 in the circumferential direction may be different from each other.

The connection hole 27 is open to, of an inner surface defining one of the end portions (connection portions) of the second orifice passage 26 in the circumferential direction, an outer peripheral surface that is located outward in the radial direction and that faces inward in the radial direction. The one of the end portions of the second orifice passage 26 in the circumferential direction is connected to the one of the end portions of the first orifice passage 25 in the circumferential direction through the connection hole 27.

The second connecting hole 22 is open to, of an inner surface defining the other of the end portions of the second orifice passage 26 in the circumferential direction, an inner peripheral surface that is located inward in the radial direction and that faces outward in the radial direction. The other of the end portions of the second orifice passage 26 in the circumferential direction is connected to the sub-liquid chamber 16 through the second connecting hole 22.

A short passage 20 that directly connects the connection portion between the first orifice passage 25 and second orifice passage 26 and the sub-liquid chamber 16 is formed in the partition member 17. In the present embodiment, the short passage 20 is open to the one of the end portions of the second orifice passage 26 in the circumferential direction.

Note that, the short passage 20 may be open toward the one of the end portions of the first orifice passage 25 in the circumferential direction, or toward the connection hole 27.

The short passage 20 is open to, of the inner surface of the second orifice passage 26, an inner peripheral surface that is located inward in the radial direction and that faces outward in the radial direction. The short passage 20 is formed in a portion that is opposite the connection hole 27 in the radial direction and that defines the one of the end portions of the second orifice passage 26 in the circumferential direction. The short passage 20 penetrates the inner cylinder 33b in the radial direction. The short passage 20 is provided on the opposite side of the second connecting hole 22 across the inner partition wall 33f in the circumferential direction.

The short passage 20 and second connecting hole 22 are adjacent to the inner partition wall 33f in the circumferential direction.

The short passage 20 is open in the radial direction to a portion that is surrounded from the outside in the radial direction by the first orifice passage 25 and second orifice passage 26 and that is opposite the lower surface of the membrane 31 in the axial direction. Note that, the short passage 20 may be open in the axial direction to the sub-liquid chamber 16. The flow path length of the short passage 20 is shorter than the flow path length of each of the first orifice passage 25 and second orifice passage 26.

The positions of the short passage 20 and second connecting hole 22 in the axial direction are equivalent to each other at least in part. The size of the short passage 20 in the axial direction is smaller than the size of the second connecting hole 22 in the axial direction, and the position in which the short passage 20 is located in the axial direction is included in the position in which the second connecting hole 22 is located in the axial direction.

The flow path cross-sectional area of the short passage 20 is, for example, 1.7 mm$^2$ or larger, and is smaller than the flow path cross-sectional area of the one of the end portions of each of the first orifice passage 25 and second orifice passage 26 in the circumferential direction, and is smaller than the flow path cross-sectional area of the connection hole 27. The flow path cross-sectional area of the short passage 20 is smaller than the flow path cross-sectional area of each of the first connecting hole 21 and second connecting hole 22.

The flow path length of the first orifice passage 25 is longer than the flow path length of the second orifice passage 26, and the flow path cross-sectional area of the first orifice passage 25 is larger than the flow path cross-sectional area of the second orifice passage 26. The flow resistance of each of the first orifice passage 25 and second orifice passage 26 is tuned so that the resonance frequency of each of the passages 25 and 26 coincides with the frequency of, for example, shake vibration.

Note that, the flow resistance of each of the first orifice passage 25 and second orifice passage 26 may be made different from each other or equal to each other.

Next, the operation of the anti-vibration device 1 configured as described above will be described.

When vibration is input to the anti-vibration device 1 and the first attachment member 11 and second attachment member 12 are relatively displaced, the elastic body 13 connecting the first attachment member 11 and second attachment member 12 to each other is elastically deformed. At this time, the internal pressure of the main liquid chamber 15 fluctuates, and the liquid resonates while traveling between the main liquid chamber 15 and sub-liquid chamber 16 through the first orifice passage 25 and second orifice passage 26, thereby damping and absorbing the vibration. When the internal pressure of the main liquid chamber 15 fluctuates, dynamic spring is suppressed by the membrane 31 deformed elastically in the axial direction with its outer peripheral edge as the fixed end.

As described above, according to the anti-vibration device 1 of the present embodiment, the first orifice passage 25 extends from the main liquid chamber 15 to one side in the circumferential direction, and the second orifice passage 26 extends from the connection portion with the first orifice passage 25 to the other side in the circumferential direction. Thus, when the liquid flows through the first orifice passage 25 and second orifice passage 26 from one of the main liquid chamber 15 and sub-liquid chamber 16 to the other, a flow direction in the first orifice passage 25 and a flow direction in the second orifice passage 26 are opposite. Therefore, for example, compared to a case in which the first orifice passage 25 and second orifice passage 26 are directly connected in the circumferential direction and the aforementioned flow directions are in the same direction, it is easier to increase or decrease the flow resistance of the liquid in accordance with increase or decrease in amplitude of input vibration, i.e., increase or decrease in flow velocity of the liquid flowing through the first orifice passage 25 and second orifice passage 26. This allows liquid column resonance to occur in the first orifice passage 25 and second orifice passage 26 to damp and absorb input vibration even if the amplitude increases or decreases, as long as the frequency is the same.

Since the short passage 20, which directly connects the connection portion between the first orifice passage 25 and second orifice passage 26 and the sub-liquid chamber 16, is formed in the partition member 17, a part of the liquid that reaches the connection portion between the first orifice passage 25 and second orifice passage 26 during vibration input can escape through the short passage 20 to the sub-liquid chamber 16. This prevents retention of the liquid at the connection portion and allows the liquid to flow smoothly through the first orifice passage 25 and second orifice passage 26, thereby suppressing dynamic spring.

Since the first orifice passage 25 and second orifice passage 26 are arranged to be connected to each other in the radial direction, the bulkiness of the anti-vibration device 1 in the axial direction can be prevented.

Since the flow path cross-sectional area of the short passage 20 is smaller than the flow path cross-sectional area of the connection portion between the first orifice passage 25 and second orifice passage 26, the resonance frequency or the like of the first orifice passage 25 and second orifice passage 26 can be easily tuned.

Since the partition member 17 is provided with the membrane 31 that forms a part of the partition wall of each of the main liquid chamber 15 and sub-liquid chamber 16 and that is provided to be elastically deformable, it is possible to elastically deform the membrane 31 during vibration input, thereby keeping the dynamic spring low.

In particular, when a vibration with a small amplitude (e.g., 0.05 mm to 0.2 mm) is input, the dynamic spring can be kept low by elastically deforming the membrane 31. When a vibration with a larger amplitude (e.g., 0.2 mm to 1.0 mm) than this amplitude is input, the input vibration can be damped and absorbed by flowing the liquid through the first orifice passage 25 and second orifice passage 26, even if the amplitude is increased or decreased, as long as the frequency is the same.

Since the membrane 31 is provided to be elastically deformable to form a part of the partition wall of each of the main liquid chamber 15 and sub-liquid chamber 16, and is not, for example, a so-called rattling membrane that is movably housed in a housing chamber connected to both the main liquid chamber 15 and sub-liquid chamber 16, the membrane 31 is not likely to collide with other parts during vibration input and generate a percussion sound.

Since the short passage 20 is open in the radial direction to a portion of the sub-liquid chamber 16 that is surrounded from the outside in the radial direction by the first orifice passage 25 and second orifice passage 26 and that is opposite the membrane 31, it is possible to make it difficult for the short passage 20 to be blocked by, for example, a member such as the diaphragm 19 that forms a part of partition walls of the sub-liquid chamber 16, thus allowing the liquid to flow smoothly from the short passage 20 into the sub-liquid chamber 16.

Note that, the technical scope of the present disclosure is not limited to the embodiment described above, and various variations can be made without departing from the intent of the present disclosure.

The relative positions of the first orifice passage 25 and second orifice passage 26 may be changed as appropriate, for example, by providing the second orifice passage 26 outward from the first orifice passage 25 in the radial direction, by connecting the first orifice passage 25 and second orifice passage 26 to each other in the axial direction, or the like.

The positions of the first orifice passage 25 and second orifice passage 26 with respect to the membrane 31 may be changed as appropriate, for example, by making the positions in the axial direction equivalent to each other, or the like.

The connection hole 27 may be open, for example, to a middle portion of at least one of the first orifice passage 25 or second orifice passage 26 in the circumferential direction.

The above embodiment describes the compression type anti-vibration device 1 in which positive pressure acts on the main liquid chamber 15 by the action of a support load, but is also applicable to a suspension type anti-vibration device 1 in which the main liquid chamber 15 is mounted such that the main liquid chamber 15 is positioned on the lower side in a vertical direction and the sub-liquid chamber 16 is positioned on the upper side in the vertical direction, and negative pressure acts on the main liquid chamber 15 by the action of a support load.

The anti-vibration device 1 according to the present disclosure can also be applied to, not limited to the engine mounts for vehicles, other than the engine mounts. For example, the anti-vibration device 1 can be applied to cabin mounts or bushings for vehicles, or to generator mounts on construction machinery, or to machine mounts installed in factories.

In addition, to the extent not departing from the intent of the present disclosure, it is possible to replace the components in the above embodiment with well-known components, and the above embodiment and variations may be combined as appropriate.

According to the anti-vibration device of the above aspect of the present disclosure, the first orifice passage (25) extends from the main liquid chamber (15) to one side in the circumferential direction and the second orifice passage (26) extends from the connection portion with the first orifice passage to the other side in the circumferential direction, so that, when the liquid flows through the first orifice passage and second orifice passage from one of the main liquid chamber and sub-liquid chamber to the other, the flow direction in the first orifice passage and the flow direction in the second orifice passage are opposite. Therefore, compared to a case in which, for example, the first orifice passage and second orifice passage are directly connected in the circumferential direction and the respective flow directions are in the same direction, it is easier to increase or decrease the flow resistance of the liquid in accordance with increase or decrease in amplitude of input vibration, that is, increase or decrease in flow velocity of the liquid flowing through the first orifice passage and second orifice passage. Therefore, even if the amplitude increases or decreases, liquid column resonance can occur in the first orifice passage and second orifice passage and thereby the input vibration can be damped and absorbed, as long as the frequency is the same.

Since the short passage (20), which directly connects the connection portion between the first orifice passage and second orifice passage and the sub-liquid chamber, is formed in the partition member, a part of the liquid that reaches the connection portion between the first orifice passage and second orifice passage during vibration input can escape through the short passage to the sub-liquid chamber. This prevents retention of the liquid at the connection portion and allows the liquid to flow smoothly through the first orifice passage and second orifice passage, thereby suppressing dynamic spring.

When the first orifice passage and second orifice passage are arranged to be connected to each other in the radial direction, the bulkiness of the anti-vibration device in the axial direction can be prevented.

In the above aspect, the flow passage cross-sectional area of the short passage may be smaller than the flow passage cross-sectional area of the connection portion between the first orifice passage and second orifice passage.

In this case, since the flow path cross-sectional area of the short passage is smaller than the flow path cross-sectional area of the connection portion between the first orifice passage and second orifice passage, the resonance frequency or the like of the first orifice passage and second orifice passage can be easily tuned.

In the above aspect, the partition member may be provided with a membrane that forms a part of the partition wall of each of the main liquid chamber and sub-liquid chamber and that is provided to be elastically deformable.

In this case, since the partition member is provided with the membrane that forms a part of the partition wall of each of the main liquid chamber and sub-liquid chamber and that is provided to be elastically deformable, it is possible to elastically deform the membrane during vibration input, thereby keeping the dynamic spring low.

Since the membrane is provided to be elastically deformable to form a part of the partition wall of each of the main liquid chamber and sub-liquid chamber, and is not, for example, a so-called rattling membrane that is movably housed in a housing chamber connected to both the main liquid chamber and sub-liquid chamber, the membrane is not likely to collide with other parts during vibration input and generate a percussion sound.

In the above aspect, the short passage may be open in the radial direction to a portion of the sub-liquid chamber that is surrounded from the outside in the radial direction by the first orifice passage and second orifice passage and that is opposite the membrane.

In this case, since the short passage is open in the radial direction to the portion of the sub-liquid chamber that is surrounded from the outside in the radial direction by the first orifice passage and second orifice passage and that is opposite the membrane, the short passage is less likely to be blocked by a member such as the diaphragm that forms a part of the partition wall of the sub-liquid chamber, for example. This makes it possible for the liquid to flow smoothly from the short passage into the sub-liquid chamber.

INDUSTRIAL APPLICABILITY

The present disclosure can be used in an anti-vibration device having a main liquid chamber and a sub-liquid chamber in which a liquid is sealed.

REFERENCE SIGNS LIST 1 anti-vibration device
11 first attachment member
12 second attachment member
13 elastic body
14 liquid chamber
15 main liquid chamber
16 sub-liquid chamber
17 partition member
20 short passage
25 first orifice passage
26 second orifice passage
27 connection hole
31 membrane
O central axis

The invention claimed is:

1. An anti-vibration device comprising:
a cylindrical first attachment member connected to one of a vibration generator and a vibration receiver, and a second attachment member connected to the other;
an elastic body connecting the first attachment member and the second attachment member; and
a partition member partitioning a liquid chamber in the first attachment member into a main liquid chamber and a sub-liquid chamber, the main liquid chamber having the elastic body as a part of a partition wall, wherein
the partition member comprises:
a first orifice passage extending from the main liquid chamber to a side of the sub-liquid chamber; and
a second orifice passage extending from the sub-liquid chamber to a side of the main liquid chamber and connected to the first orifice passage in a radial direction,
the first orifice passage extends from the main liquid chamber to one side in a circumferential direction along a central axis of the first attachment member,
the second orifice passage extends from a connection portion with the first orifice passage to the other side in the circumferential direction, and
in the partition member, a short passage directly connecting the connection portion between the first orifice passage and the second orifice passage and the sub-liquid chamber is formed,
wherein a flow path cross-sectional area of the short passage is smaller than a flow path cross-sectional area of the connection portion between the first orifice passage and the second orifice passage,
wherein the partition member forms a part of a partition wall of each of the main liquid chamber and the sub-liquid chamber, and has a membrane provided to be elastically deformable and
wherein the short passage is open in the radial direction to a portion of the sub-liquid chamber, the portion being surrounded by the first orifice passage and the second orifice passage and being opposite the membrane and
wherein the connection portion between the first orifice passage and the second orifice passage is arranged outside the membrane in the radial direction.

* * * * *